July 16, 1968 W. ANLIKER 3,392,768
CUTTING OR SLICING MACHINES
Filed May 2, 1966 2 Sheets-Sheet 1
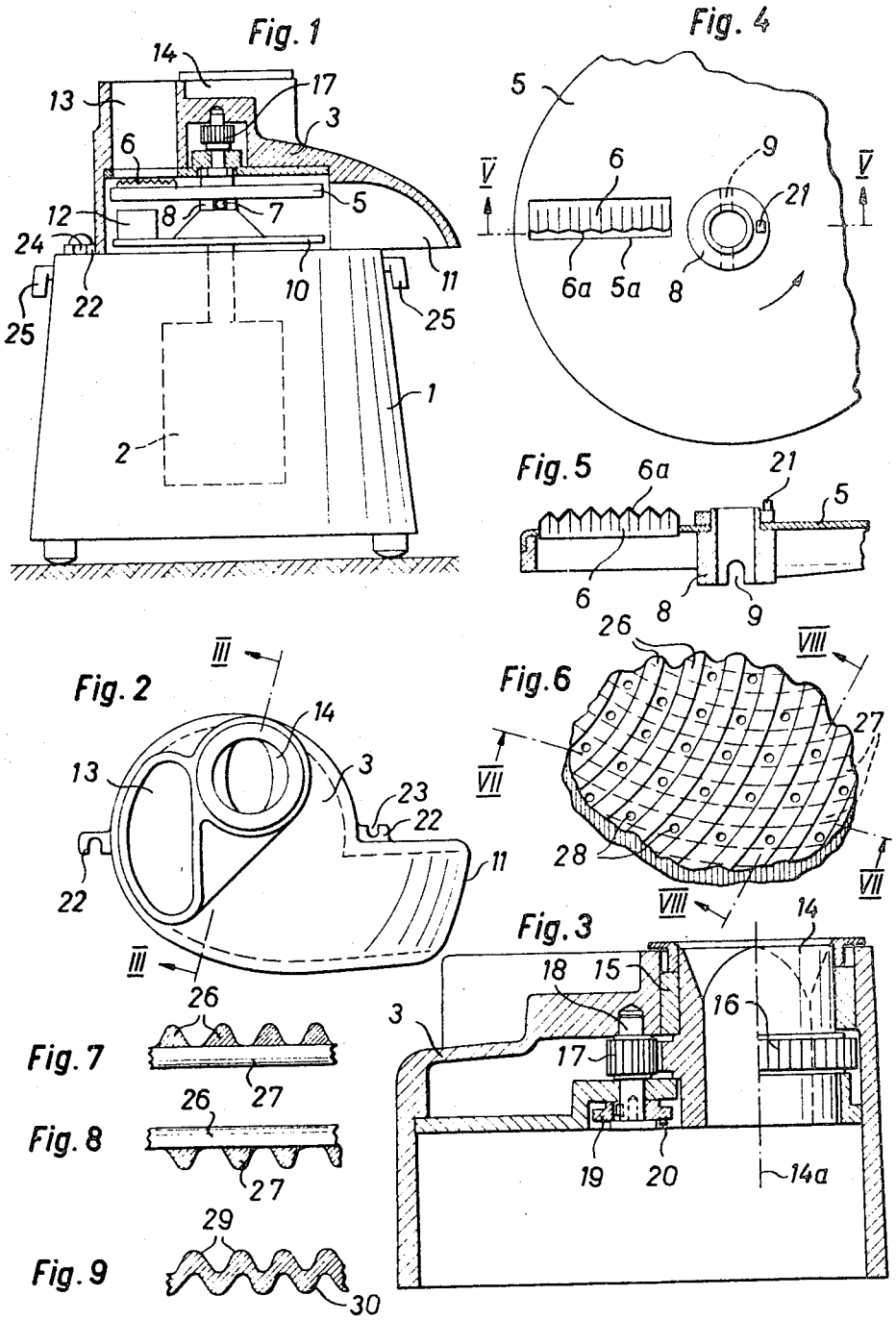
INVENTOR.
Werner Anliker
BY
Watson, Cole, Grindle & Watson
Attys.

July 16, 1968 W. ANLIKER 3,392,768
CUTTING OR SLICING MACHINES
Filed May 2, 1966 2 Sheets-Sheet 2
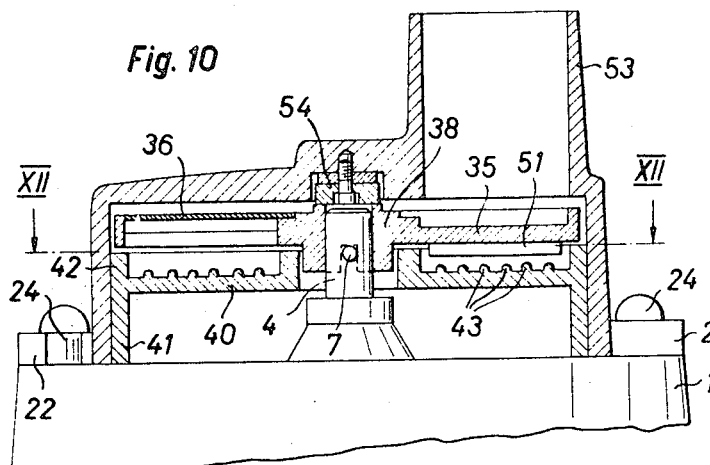
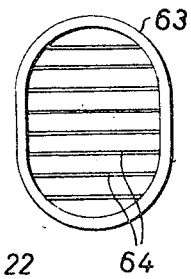
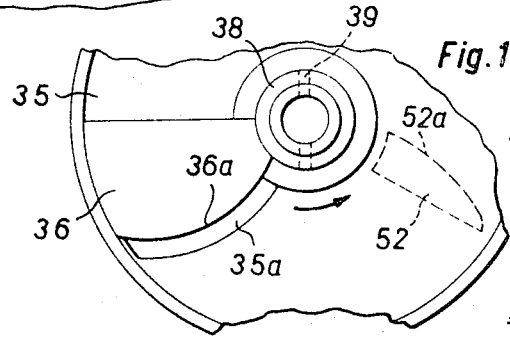
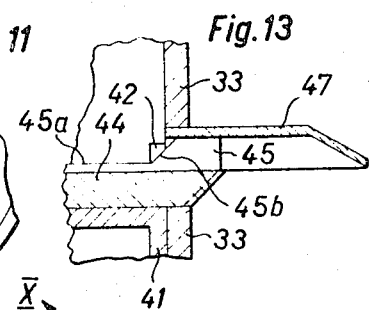
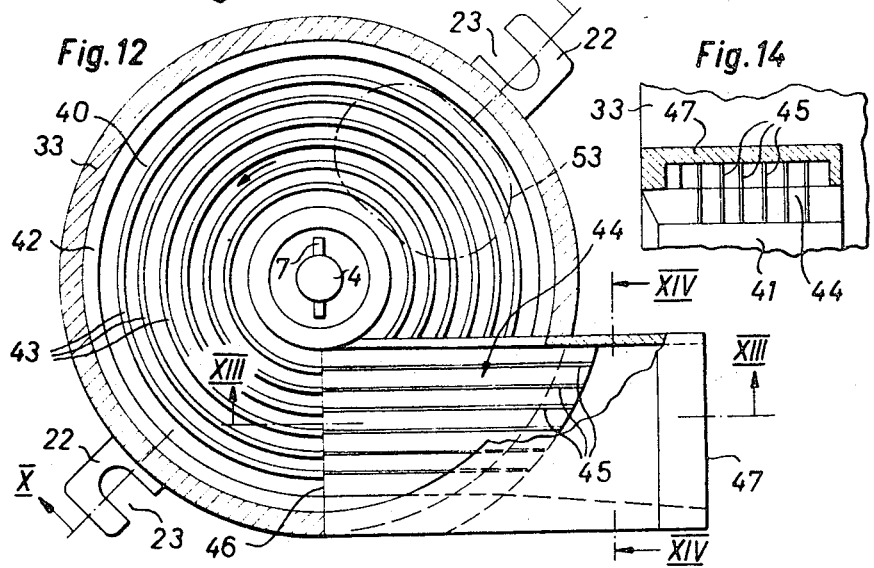
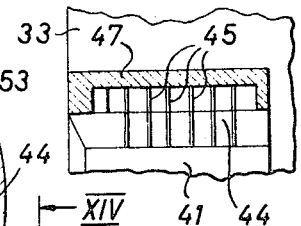
INVENTOR.
Werner Anliker
BY Watson, Cole, Grindle & Watson
Attys.

3,392,768
CUTTING OR SLICING MACHINES
Werner Anliker, Zelghalde 14,
Zurich, Switzerland
Filed May 2, 1966, Ser. No. 546,622
Claims priority, application Switzerland, May 3, 1967,
6,274/65
5 Claims. (Cl. 146—78)

The present invention relates to a slicing or cutting machine for slicing of vegetables, fruits or similar sliceable material and for the preparation of foodstuffs. The slicing or cutting machine is intended primarily for hotel and restaurant use, but it can however be used in a normal family household. On the other hand, it is not to be considered as an agricultural slicing or cutting machine for the preparation of vegetables and fruits in large quantities.

The invention has for its purpose the provision of facilities for cutting or slicing, in particular, root vegetables, such as potatoes, carrots or celery, as well as fleshy fruits such, for example, as apples and to be able to rapidly and conveniently cut them into equal slices, small sticks or cubes. The same purpose was served by hand-operated apparatus which are already known, but these have however, substantial disadvantages. They require, for their operation a substantially high expenditure of energy, and supply not always equally formed cut products and produce mainly blemished cut surfaces, which are rough and exhibit damaged cells, since the material is frequently crushed during cutting, as a result of which juice exudes from the cut surfaces and a rapid oxidation of the cut surfaces takes place.

The problem primarily to be solved by the invention lies in the provision of a household slicing or cutting machine suitable for the said purpose, which does not have the above referred to disadvantages and is capable of making the desired cut or sliced products with a minimum expenditure of energy, without crushing the material and with the production both rapidly and evenly of smooth cut surfaces.

According to the present invention there is provided a slicing or cutting machine for vegetables, fruit or similar sliceable material for slicing, comprising a knife rotatable on a circular path about a shaft, on which the cutting edge extends outwardly from a shaft, a motor for driving the shaft carrying the knife, an enclosing cover spaced from the path of movement of the knife and detachably secured to a housing containing the motor, an inlet for feeding the material to be cut at least substantially normally to the path of movement of the knife, an outlet for the delivery of the cut material, a guide disc within the cover for guidance of the cut material to the outlet, arranged coaxially with the shaft and on the discharge side of the path of movement of the knife, and a projection arranged for movement relative to the circular path of the shaft for moving the cut-up material between the guide disc and the path of movement of the knife and driven by the shaft synchronously with the knife in order to displace the cut-up material to the guide disc and to the outlet.

There are several advantageous modified embodiments of the household slicing or cutting machine in accordance with the invention. In a preferred embodiment of the slicing machine the cutting edge of the knife has a corrugated or sinuous form for the production of ribs and troughs on the cut surfaces of the sliceable material, so that waffle-like discs are formed as the cut product. The feed inlet may be rotatable about its longitudinal axis in the cover for the rotation of the sliceable material which is lying within the inlet through, for example, an angle of 90° for each revolution of the knife. Thus there is formed on the one cut surface on the disc, ribs and troughs, which lie obliquely to each of the opposite surfaces of the same disc.

In another preferred embodiment of the cutting or slicing machine in accordance with the invention the rotating knife has a cutting edge movable in one plane, whilst several straight fixed separating knives are arranged parallel to one another in the path of movement from the guide disc for the outlet of the disc-like material formed by means of the rotating knife. The projection rotating with the shaft of the knife may have a substantially spiral form of outwardly-extending leading surface in relation to the shaft, in order to guide the sliced material to the fixed separating knives. The end product is small sticks of equal size.

As a modification of the last-mentioned embodiment the internal space of the feed inlet for the sliceable material may likewise be provided with a plurality of parallel fixed separating knives, which extend parallel to the longitudinal axis of the feed inlet and substantially radially to the shaft of the rotary knife. In this case the end product is cubes of equal size made of the sliceable material.

Two embodiments of machines in accordance with the invention will now be described, by way of example, with reference to the accompanying diagrammatic drawings, in which:

FIGURE 1 shows a first embodiment of a household cutting or slicing machine in accordance with the invention, partly as an external view and partly in vertical section;

FIGURE 2 is a plan view of the upper part of the machine;

FIGURE 3 is a vertical section, to an enlarged scale, on the line III—III of FIGURE 2;

FIGURE 4 is a fragmentary plan view of a disc carrying the rotary knife of the machine of FIGURE 1, this view likewise being to an enlarged scale in relation to FIGURES 1 and 2;

FIGURE 5 is a cross-section on the line V—V of FIGURE 4;

FIGURE 6 is a potato slice made by use of the machine according to FIGURES 1 to 5;

FIGURE 7 is a cross-section on the line VII—VII of FIGURE 6;

FIGURE 8 is a similar section on the line VIII—VIII of FIGURE 6;

FIGURE 9 is a cross-section through a differently formed potato-slice, which is nevertheless made on the same machine;

FIGURE 10 shows the upper part, in vertical section on the line X—X of FIG. 12 of a second embodiment of the machine in accordance with the invention, parts thereof being shown in external view;

FIGURE 11 is a fragmentary plan view of a disc carrying the rotating knife of the machine according to FIGURE 10;

FIGURE 12 is a horizontal section on the line XII—XII on FIGURE 10;

FIGURE 13 is a fragmentary vertical section on the line XIII—XIII of FIGURE 12;

FIGURE 14 is a cross-section on the line XIV—XIV of FIGURE 2; and

FIGURE 15 is a modified embodiment in plan view of a feed-in device for the articles to be sliced.

The cutting machine illustrated in FIGURES 1 to 5 serves for the cutting of vegetables and fruits, in particular for wafer thin slices of apple (potato, pommes gauffrettes). The machine has a lower part acting as a base 1, which contains an electric motor 2 (broken lines), and, if necessary, a suitable reduction gear. A cover 3 is detachably mounted on the base 1, which cover contains the following parts of the machine which are explained in detail hereinafter.

A disc 5 is secured to a vertical shaft 4, which extends out of the base 1 and is drivable by the motor 2, the disc serving as a carrier for a knife 6. The motor shaft 4 has for this purpose a cross-pin 7 (FIGURE 1), and a boss 8 of the disc 5 is provided at its lower end with a diametral slot 9 (FIGURES 4 and 5), in which the cross-pin 7 engages. The knife 6 has a cutting edge 6a extending substantially radially in relation to the hub 8, and is corrugated or sinuous as indicated in FIGURE 5. The corrugated or sinuous form of the cutting edge 6a is formed in the illustrated example by alternately oppositely directed arcuate curves of the knife edge. It would also however be possible, alternatively to provide the knife edge with oppositely directed angles (in the manner of saw teeth) of for example 90°, between which the cutting edge of the knife extends rectilinearly from angle to angle. According to FIGURE 5 the cutting edge 6a lies somewhat above the surface of the disc 5, which in the region of the knife 6 has a radial slot 5a through which the vegetables or slices of fruit sliced by the knife 6 are directed to the underside of the disc 5.

As seen in FIGURE 1 a second disc 10 is detachably secured at a predetermined distance below the disc 5 on the shaft 4, which is so arranged, that the cut slices of fruit or vegetable are directed by centrifugal action through an outlet or discharge opening 11 of the cover 3. Between the two discs 5 and 10 there is provided a tang or other projection 12 which rotates synchronously with the knife 6 and which, in the illustrated embodiment, is arranged on the upper side of the centrifuging disc 10 and is upstanding therefrom. In order to avoid accidents it is preferable, to make the tang 12 bendable, for example of rubber.

The cover 3, which encloses both discs 5 and 10 but is spaced therefrom, has two upper feed inlets 13 and 14 for articles or other material to be sliced. The passage afforded by both inlets 13 and 14 is normal to the plane of the disc 5. The one inlet 13 has a fairly large free breadth, in order to render it possible to introduce relatively larger sizes of vegetable pieces, and the said inlet 13 is fixed to the cover 3, whilst the other feed inlet 14 is rotatably mounted about its longitudinal axis 14a, as indicated in FIGURE 3. To this purpose the outer surface of the inlet 14 is cylindrical. To facilitate rotation a bearing bushing 15 is provided, which, however, can be replaced by a needle bearing or the like. The internal space defined by the inlet 14 has a generally elliptical cross-section, as shown in FIG. 2, the article to be sliced, for example a potato, on rotation of the inlet 14 being forced to rotate therewith.

For driving the feed inlet 14 there is provided at its outer periphery a crown 16 of gear teeth, which as shown in FIGURE 3 is in engagement with the pinion 17. The latter is fast with a shaft 18, which is coaxial with the shaft 4 and lies in the upper part of the cover 3. A clutch disc 19 having an engaging dog 20 is keyed on the pinion shaft 18. A complementary opposed dog 21 is mounted on the upper face of the boss 8 of the disc 5. By cooperation of both dogs 20 and 21 the pinion shaft 18 is driven at the same time as the shaft 4, which through the gear wheels 17 and 16 effects the rotation of the inlet 14. The transmission ratio of the gear wheels 17 and 16 is 4:1 so that for each rotation of the knife 16 the inlet 14 rotates through 90°.

Two diametrically opposed projections 22 are mounted on the lower rim of the cover 3, each having an open slot 23 (FIGURES 1 and 2). On the upper surface of the base 1 two studs 24 each with a head are arranged, which with the aid of a pivotal lever 25 can be raised and lowered by an eccentric (not shown). By means of the said studs 24 the cover 3 is secured to the base 1, in which the studs 24 engaging in the slots 23 of the projections 22. By suitable pivotable movement of each lever 25 the projections 22 can be clamped with the aid of the heads of the studs 24 to the upper face of the base 1.

The manner of use and the operation of the above described cutting or slicing machine is as follows:

When the motor 2 is switched on, the discs 5 and 10 are rotated by the shaft 4. By this means the knife 6 moves in a circular path about the shaft 4, together with the tang 12. Then the articles to be sliced or cut, for example potatoes, are successively introduced into the feed inlet 14. On each rotation of the disc 5 a disc-like slice 26 (FIGURES 6 and 8) is cut off, the cut faces being formed with sinuous surface by the sinuous cutting edge 6a with ribs and troughs in between.

During one revolution of the knife 6 the inlet 14 together with the article therein rotates through 90°, so that the ribs 26 of the upper surface of the disc are substantially at right angles to the ribs 27 on the under side of the same disc, as shown in FIGURES 6–8. The disc therefore has a waffle like appearance. At the intersections of the edges between the ribs 26 and 27 both sides of the disc 25 meet at the same holes 28 (FIGURE 6). The thus formed discs are then flung outwardly by the centrifuging disc 10 and the tang 12 to the outlet 11.

Since the discs cut by the machine have a fairly large surface and additionally have holes 28, the fritters are permeated by hot oil very rapidly. The oil can pass through holes 28. The discs or slices have moreover a pleasing appearance.

If the articles to be sliced or cut are introduced to the knife 6, not through the inlet 14, but through the fixed inlet 13, there are formed on both faces of the discs ribs 29 and 30 extending parallel to one another as shown in FIGURE 9. Thus the troughs between the ribs 29 of the upper face are made to lie exactly opposite the ribs 30 of the lower face. In known apparatus for hand operation this is in general not possible since in known graters a lateral displacement of the material to be sliced or cut takes place in order that half of the distance of the ribs is preserved, with the result, that the troughs of the upper side coincide with the troughs of the lower side of the slices disc and the danger arises that the discs will break in half.

It will be clear that the machine according to FIGURES 1 to 5 can slice or cut not only potatoes, but also other root vegetables and fleshy fruits, such as carrots, celery, apples and the like, into waffle-like discs.

The second embodiment of the machine illustrated in FIGS. 10 to 14 is intended for cutting of fruits and vegetables into short sticks, in particular for the preparation of potato chips from potatoes. The machine has the same base 1, which again has a (not illustrated) motor for driving the shaft 4. In place of the cover 3 of the first embodiment a somewhat differently shaped cover 33 is clamped with the aid of the projections 22 with slots 23 by means of studs 24 to the upper face of the base 1. The end of the shaft terminating within the cover 33 carries a disc 35, to which is secured on its upper face a knife 36. The cutting edge 36a of the knife extends in a plane normal to the axis of the shaft 4 and curves outwardly from the shaft 4. It can, however, be provided with a rectilinear cutting edge. The disc 35 is provided beneath the cutting edge 36a with an outlet slot 35a for the slices or pieces which have been cut. As in the first embodiment the boss 38 of the disc 35 has a dimetral slot 39 in its lower end in which the cross-pin 7 of the shaft 4 engages, for the purpose of coupling the disc 35 to the shaft 4.

Below the disc 35 carrying the knife 36 a second disc 40 is arranged, which however, is supported nonrotatably by means of a cylindrical rim 41 lying on the base 1. The upper face of the disc 40 is provided with a peripheral rim 42 and with a plurality of circular ribs 43, which are arranged concentrically to one another and to the low-friction guidance of the sliced material on the disc 40.

From the disc 40 a sector is cut out into which there is inserted a straight slide path 44 for the sliced material. The slide path 44 is assembled from a plurality of parallel members, between which quite thin laminar knives 45 are arranged. These laminar knives 45 meet the ribs 43 tangentially and, as shown in FIGURE 12, on the line 46. The slide path 44 and the knife laminae 45 extend through the rim 42 of the guide disc 40 as well as through the peripheral wall of the cover 33, in order to guide the prepared cut material through an outlet 47. The height of the laminae 45 is not constant. From the line 46 outwardly the upper edge 45a (see FIGURE 13) of the laminae 45 initially has approximately the same height as the apices of the ribs 43. Approximately where the peripheral rim 42 of the disc 40 is intercepted, the laminae 45 have an oblique cutting edge 45b, which serve for cutting the sliced material into individual sticks. The laminae 45 form stationary separating knives in the discharge outlet of the machine.

On the lower face of the disc 35 carrying the knife 36 there is secured a projection 52 as shown in FIGURES 10 and 11, the leading edge of which 52a (FIGURE 11) at least has an approximately spiral shape extending from the shaft 4 and the hub 38 outwardly and thus it is ensured that the rotating knife 36 displaces the cut material on the ribs 43 of the disc 40 on to the knife laminae 45. For the feed of the material to be cut to the knife 36 an inlet 53 is arranged on the upper face of the cover 33. In FIGURE 12 the position of the feed inlet 53 is indicated by chain lines. It should be noted that the inlet 53 and the oblique cutting edges 45b of the knife laminae 45 are separated from one another angularly by 270° if the direction of rotation is assumed to be as indicated by the arrow in FIGURE 12 indicating a direction of rotation of the shaft 4.

The cover 33 is finally provided with an axial thrust bearing 54, which, if necessary, acts as a further bearing for the upper end of the boss 38 of the disc 35, in case, the disc 35 might be displaced upwardly by the material being cut.

The manner of use and the operation of the second embodiment of the machine is as follows:

When the motor is switched on and the shaft 4 together with the disc 35 is rotated, the articles to be sliced, for example potatoes, are introduced through the inlet 53 on the upper face of the disc 35. The knife 36 moves over a circular path and cuts off with each rotation a slice of the material, the thickness of the slice being determined by the distance of the cutting edge 36a from the upper face of the disc 35 directly in front of the edge 36a. The cut-off slices fall on the ribs 43 of the stationary guide disc 40 and by means of the projection 52 are pushed on to the knife laminae 45. The oblique cutting edges 45b separate the cut slices into several parallel rods or sticks, which then fall out through the discharge outlet 47.

A particular advantage of the described machine lies in that the material to be cut is sliced both by the rotary knife 36 as well as by the fixed separating knife laminae 45, and is not shaved off, whereby smooth surfaces without damaged cells are formed. Thus only a little juice is lost from the cut faces and this results in no rough surfaces, which are particularly liable to rapid oxidation. Finally the cut sticks are absolutely straight and they have equal cross-sectional dimensions.

In FIGURE 15 a modification of the hereinbefore described stick cutting machine is shown with a feed inlet 63, in which a plurality of knife laminae 64 are rigidly mounted parallel to the axis of the inlet. The knife laminae 64 extend substantially radially to the axis of the shaft 4. With the described modification according to FIGURE 15 the machine is manufactured in a substantially similar construction as shown in FIGURES 10 to 14 and serves to make not sticks but cubes of the material to be cut.

This is achieved because the material on introduction through the feed inlet 63 is cut into slices on introduction through the knife laminae 64. By rotation of the knife 36 sticks are formed, which are subsequently cut into cubes with the aid of the stationary separating knife laminae 45.

Since in all the hereinbefore described embodiments the cover 3 or 33 is removable together with the discs 5 and 10 or 35 and 40 from the base 1, the same base can be used for the machine according to FIGURES 1 to 5 as for the machine according to FIGURES 10 to 15.

What I claim is:

1. A slicing or cutting machine for vegetables, fruit or similar sliceable material for slicing comprising a knife rotatable on a circular path about a shaft, of which the cutting edge extends outwardly from the shaft, a motor for driving the shaft carrying the knife, an enclosing cover spaced from the path of movement of the knife and detachably secured to a housing containing the motor, an inlet for feeding the material to be cut at least substantially normally to the path of movement of the knife, an outlet for the delivery of the cut material, a guide disc within the cover for guidance of the cut material to the outlet, arranged coaxially with the shaft and on the discharge side of the path of movement of the knife, a projection arranged for movement relative to the circular path of the shaft for moving the cut-up material between the guide disc and the path of movement of the knife and driven by the shaft synchronously with the knife in order to displace the cut-up material to the guide disc and to the outlet, a plurality of stationary rectilinear separating knives arranged parallel to one another with respect to the path of movement of the material, previously cut-up by means of the rotating knives and displaced by the guide disc to the outlet, the projection having a substantially spiral outwardly extending leading edge in relation to the shaft in order to guide the cut material to the separating knives, the guide discs being stationary and has mutually concentric circular guide ribs, for the material previously cut by means of the rotary knife, to which guide ribs the separating knife is tangentially secured.

2. A cutting machine according to claim 1, wherein the feed inlet and the outlet of the cover are angularly spaced in the direction of rotation of the shaft to give an angular separation from one another of at least 270°.

3. A cutting machine according to claim 1, wherein the rotary knife is arranged on a disc mounted on the shaft, which in the region of the cutting edge of the knife has a slot for the passage of the cut-up material, and the projection is secured on the side of the said disc facing away from the discharge side.

4. A cutting machine according to claim 1, wherein within the feed inlet several separating knives extending parallel to the longitudinal axis of the feed inlet and at least substantially parallel to the shaft.

5. A cutting machine according to claim 4, wherein the rotary knife is fixed to a boss, which is loosely mounted on the shaft and is coupled to the shaft by a dog clutch and the cover has a thrust bearing for the boss.

References Cited

UNITED STATES PATENTS

| | | | |
|---|---|---|---|
| 1,964,437 | 6/1934 | Klein | 146—124 |
| 1,965,501 | 7/1934 | Knott | 146—124 X |
| 2,280,053 | 4/1942 | Barnes | 146—125 |
| 2,490,455 | 12/1949 | Nelson et al. | 146—78 |
| 2,767,752 | 10/1956 | Stahmer | 146—124 X |
| 3,032,087 | 5/1962 | Rodwick | 146—125 |

FOREIGN PATENTS 211,152   10/1957   Australia.

W. GRAYDON ABERCROMBIE, *Primary Examiner.*

UNITED STATES PATENT OFFICE
CERTIFICATE OF CORRECTION

Patent No. 3,392,768                            July 16, 1968

Werner Anliker

It is certified that error appears in the above identified patent and that said Letters Patent are hereby corrected as shown below:

In the heading to the printed specification, lines 6 and 7, "Claims priority, application Switzerland, May 3, 1967, 6,274/65" should read -- Claims priority, applications Switzerland, May 3, 1965, 6,274/65; May 31, 1965, 7,583/65 --.

Signed and sealed this 13th day of January 1970.

(SEAL)
Attest:

Edward M. Fletcher, Jr.                    WILLIAM E. SCHUYLER, JR.
Attesting Officer                              Commissioner of Patents